G. A. KINKEL.
PIE PAN.
APPLICATION FILED AUG. 8, 1919.

1,343,395.

Patented June 15, 1920.

INVENTOR
Gustavus A. Kinkel,
by his attorney,
J. Edward Thebaud.

UNITED STATES PATENT OFFICE.

GUSTAVUS A. KINKEL, OF BUFFALO, NEW YORK.

PIE-PAN.

1,343,395.   Specification of Letters Patent.   Patented June 15, 1920.

Application filed August 8, 1919. Serial No. 316,093.

*To all whom it may concern:*

Be it known that I, GUSTAVUS A. KINKEL, a citizen of the United States, residing at Buffalo, in the county of Erie and State of New York, have invented certain new and useful Improvements in Pie-Pans, of which the following is a specification, reference being had to the accompanying drawings, and to figures of reference marked thereon, which form part of this specification.

Like figures of reference refer to like parts.

This invention relates to pie pans.

In using the ordinary pie pans for baking pies it is not unusual to have the edge of the outer or top layer of crust, which extends beyond the body of the pie, containing the filling, become over baked or burned in a manner to destroy the good flavor of the pie, as well as to permeate and taint the body of the pie with the obnoxious gases of destructive distillation coming from the over baked or burnt crust portion. Another defect of the common pie pans is the lack of any means to prevent the juices of the pie from running over the edge of the pan while the baking is going on, which not only results in a loss of part of the good ingredients of the pie, but soils the oven bottom and creates bad odors.

I, therefore have certain objects in providing an improved pie pan construction, one of which is to form integral with the common pan structure, an up-standing wall at the periphery of the flat pan flange, to dam the pie juices from flowing over the edge of the pan, and also to reduce the width of the pie crust edge required to seal in the juices; another object being to provide means in the construction of a one-piece pie pan, for serving the purpose of radiating heat from the usual flat pan flange upon which rests the thin peripheral edge of the upper crust, to carry off the excess heat which otherwise causes the burning.

A further object is to provide a pie pan structure which will be in one piece of sheet metal of cheap but substantial construction, while at the same time fulfilling the above objects.

One embodiment of my invention is illustrated in the accompanying drawings, the construction involved is explained and what I claim is set forth.

Figure 1:
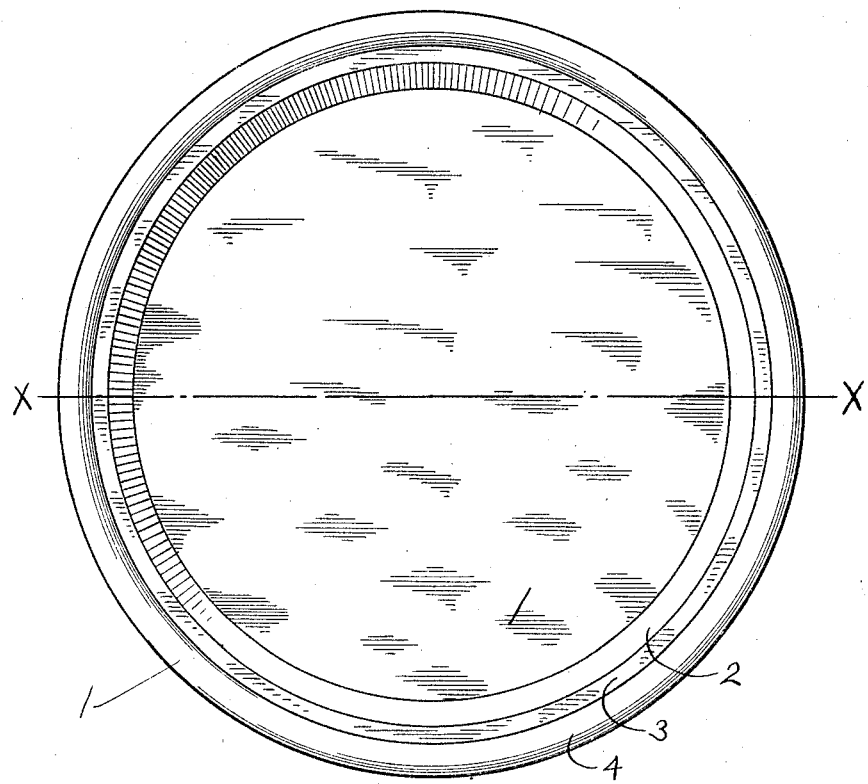
Figure 1 is the top plan view of a pie pan embodying my invention.

In the figures, the pan, made all of one piece of sheet metal, is shown to have a conical side wall 2, extending and merging into a flat flange portion 3, from which upwardly projects the curved wall 4, which, in turn merges into the flanged portion 5. This flanged portion 5 is turned down and in against the wall 2, forming a pocketed air chamber 6, which is preferably in open communication with the surrounding atmosphere, either by means of holes in the flange portion 5, or by the loose contact between the edge of the flange portion 5 and the wall 2.

Figure 2:
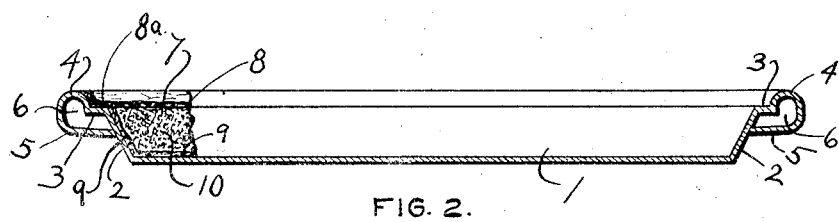
Fig. 2 is a diametral section taken on the line X—X of Fig. 1.

In Fig. 2 is shown a portion of a pie 7, having an upper crust 8 and a lower crust 9. The portion $8^a$ of the upper crust 8 extends beyond the body of the pie, including the filling 10.

In use, the wall 4 serves to dam the pie juices from running over the edge of the pan, while the flange portion 5 with the wall 4, serves to give heat radiating surface, which will carry off the excess heat from the flange 3, upon which rests the portion of crust $8^a$, which, in the absence of some means to carry off the excess heat, becomes over baked or burned. The filling 10 of the body of the pie serves to absorb heat from the wall 4 and the bottom of the pan, to keep the temperature down in the pan wall 4 and the bottom to the desired baking temperature, but the flange portion 3 without some heat radiating means naturally bakes the crust portion $8^a$ much quicker than the body of the pie bakes and consequently is over baked or burned by the time the body of the pie is baked as desired. The crust portion $8^a$ is laid up against the wall 4 and trimmed near the top of this wall. The flange portion 3 is made comparatively narrow inasmuch as the wall 4 obviates the necessity of lapping the edge portions of the upper and lower crusts, as much as is done with the common pie pan to form a seal at the connection between the upper and lower crust edges.

Having described my invention, I claim,

1. In a pie pan, a bottom portion, an annular side wall integral with said bottom portion, and an annular extension to the top part of said side wall, being radially bent downwardly and inwardly to form an annular air chamber next the top part of said side wall.

2. In a pan, a bottom portion, an annular side wall integral with said bottom portion, an annular flat portion extending radially outward from the top part of said side wall and forming a narrow zone surface practically parallel with said bottom portion, a vertical annular portion integral with said flat portion at its periphery, an extension from said vertical portion integral therewith, extending beyond and under said flat portion, where it is spaced therefrom to form an annular chamber next said flat portion.

3. A pie pan of a single piece of sheet metal, including in combination with a bottom portion, side wall extending upwardly from the periphery of said bottom portion and the usual flange, an annular wall portion, extending up from said usual flange, another portion turned thereunder and in against said side wall, and spaced from said usual flange to form an annular air chamber.

GUSTAVUS A. KINKEL.